US011921516B2

(12) United States Patent
Yamamoto et al.

(10) Patent No.: US 11,921,516 B2
(45) Date of Patent: Mar. 5, 2024

(54) MAGNETIC MARKER AND DRIVING ASSISTANCE SYSTEM

(71) Applicant: Aichi Steel Corporation, Aichi (JP)

(72) Inventors: Michiharu Yamamoto, Aichi (JP); Tomohiko Nagao, Aichi (JP); Hitoshi Aoyama, Aichi (JP)

(73) Assignee: AICHI STEEL CORPORATION, Tokai (JP)

( * ) Notice: Subject to any disclaimer, the term of this patent is extended or adjusted under 35 U.S.C. 154(b) by 78 days.

(21) Appl. No.: 16/097,487

(22) PCT Filed: Mar. 30, 2017

(86) PCT No.: PCT/JP2017/013341
§ 371 (c)(1),
(2) Date: Oct. 29, 2018

(87) PCT Pub. No.: WO2017/187879
PCT Pub. Date: Nov. 2, 2017

(65) Prior Publication Data
US 2019/0155305 A1    May 23, 2019

(30) Foreign Application Priority Data
Apr. 28, 2016   (JP) .................................. 2016-090606

(51) Int. Cl.
*G05D 1/02*   (2020.01)
*B60W 50/14*  (2020.01)
(Continued)

(52) U.S. Cl.
CPC ............ *G05D 1/0261* (2013.01); *B60W 50/14* (2013.01); *G05D 1/02* (2013.01); *G08G 1/042* (2013.01);
(Continued)

(58) Field of Classification Search
CPC ....... G05D 1/0261; G05D 1/02; B60W 50/14; B60W 30/16; G08G 1/042; G08G 1/09;
(Continued)

(56) References Cited

U.S. PATENT DOCUMENTS 2,196,824 A * 4/1940 Dahl ........................ C22C 9/06
420/92
5,781,119 A    7/1998 Yamashita et al.
(Continued)

FOREIGN PATENT DOCUMENTS

FR    2666832 A1    3/1992
JP    H08-314540 A  11/1996
(Continued)

OTHER PUBLICATIONS

Machine Translation JP-2008047148-A (Year: 2008).*
(Continued)

*Primary Examiner* — Faris S Almatrahi
*Assistant Examiner* — Andrew J Cromer
(74) *Attorney, Agent, or Firm* — XSENSUS LLP

(57) ABSTRACT

Provided is a driving assistance system using a magnetic marker capable of providing more pieces of information. In the driving assistance system for assisting driving of a vehicle, a magnetic marker (1) including a magnet sheet (11) serving as a magnetism generating unit which generates a magnetic field and also an RFID tag (15) as an information providing unit which provides information to a vehicle side is laid on a travelling road of the vehicle, and the vehicle includes a magnetic sensor serving as a magnetism detecting unit which magnetically detects the magnetic marker (1) and also a tag reader as an information acquiring unit which acquires the information provided by the RFID tag (15) included in the magnetic marker (1).

24 Claims, 9 Drawing Sheets

(51) Int. Cl.
*B62D 15/02* (2006.01)
*G05D 1/00* (2006.01)
*G08G 1/042* (2006.01)
*G08G 1/09* (2006.01)
*G08G 1/0967* (2006.01)
*G08G 1/16* (2006.01)

(52) U.S. Cl.
CPC ......... *G08G 1/09* (2013.01); *G08G 1/096783* (2013.01); *B60W 2556/65* (2020.02); *B62D 15/029* (2013.01); *G05D 2201/0213* (2013.01); *G08G 1/167* (2013.01)

(58) Field of Classification Search
CPC ........ G08G 1/096783; G08G 1/096716; E01F 11/00
See application file for complete search history.

(56) References Cited

U.S. PATENT DOCUMENTS

| | | | |
|---|---|---|---|
| 5,815,825 A | 9/1998 | Tachibana et al. | |
| 5,987,374 A | 11/1999 | Akutsu et al. | |
| 8,520,695 B1 | 8/2013 | Rubin et al. | |
| 2002/0065600 A1* | 5/2002 | Oka | G08G 1/042 |
| | | | 701/516 |
| 2002/0149493 A1* | 10/2002 | Yudate | C08K 7/14 |
| | | | 340/693.5 |
| 2004/0212472 A1* | 10/2004 | Senda | C01G 49/0036 |
| | | | 335/296 |
| 2005/0115753 A1 | 6/2005 | Pemberton et al. | |
| 2006/0061472 A1* | 3/2006 | Lovoi | A61K 9/2072 |
| | | | 340/572.1 |
| 2008/0252463 A1* | 10/2008 | Andrechak | G06K 19/04 |
| | | | 340/572.7 |
| 2009/0146518 A1* | 6/2009 | Honkura | H02K 15/03 |
| | | | 310/156.43 |
| 2014/0358331 A1* | 12/2014 | Prada Gomez | G05D 1/0234 |
| | | | 701/2 |
| 2016/0132705 A1* | 5/2016 | Kovarik | G06K 7/10376 |
| | | | 340/10.3 |
| 2016/0133366 A1* | 5/2016 | Kasamoto | C08J 5/121 |
| | | | 156/245 |
| 2016/0297436 A1* | 10/2016 | Shin | G08G 1/163 |

FOREIGN PATENT DOCUMENTS

| | | | | |
|---|---|---|---|---|
| JP | 2000105608 A | | 4/2000 | |
| JP | 2000-309912 A | | 11/2000 | |
| JP | 2005-202478 A | | 7/2005 | |
| JP | 2007-164441 A1 | | 6/2007 | |
| JP | 2007280314 A | | 10/2007 | |
| JP | 2008047148 A | * | 2/2008 | ............ E01F 9/512 |
| JP | 2008059085 A | | 3/2008 | |
| JP | 2009252078 A | | 10/2009 | |
| JP | 2010-288394 A | | 12/2010 | |
| JP | 5096862 B2 | | 12/2012 | |
| KR | 20160015341 A | | 2/2016 | |
| WO | 99/26257 A1 | | 5/1999 | |

OTHER PUBLICATIONS

European Search Report dated May 31, 2019, issued in corresponding European Application No. 17789168.6, 9 pages.
Radio-Frequency Identification, Wikipedia, Sep. 10, 2011, retrieved on Apr. 23, 2015, 36 pages.
"English-language translation of International Search Report and Written Opinion for International Application No. PCT/JP2017/013341 dated Jul. 4, 2017".
Office Action dated Oct. 22, 2021 in European Patent Application No. 17 789 168.6, 7 pages.

* cited by examiner

[FIG. 1]
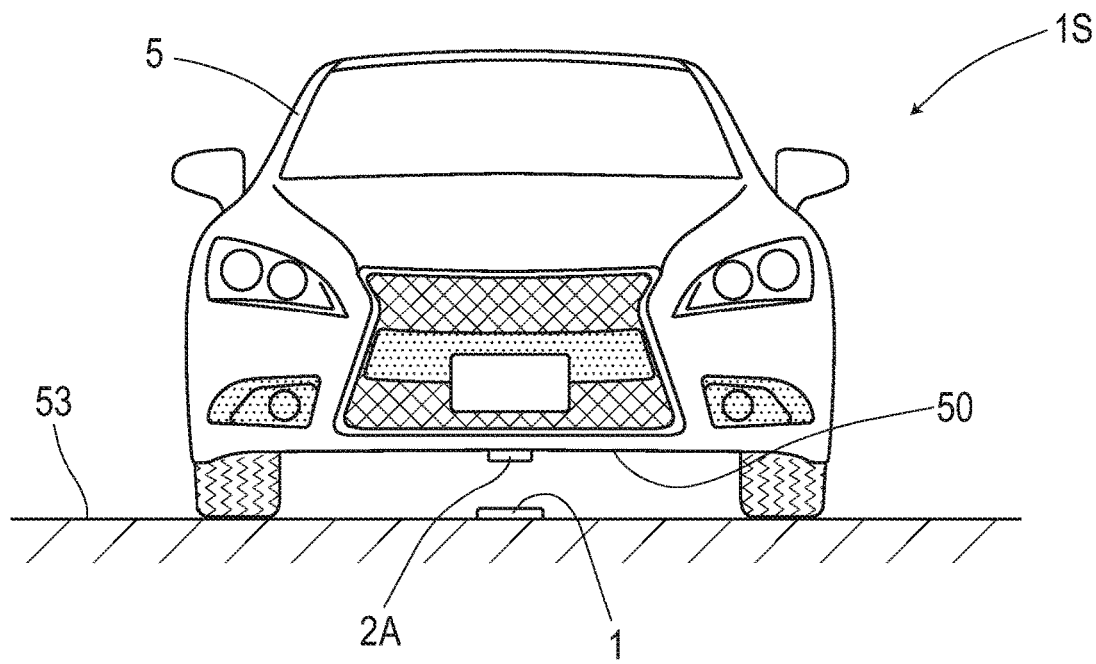

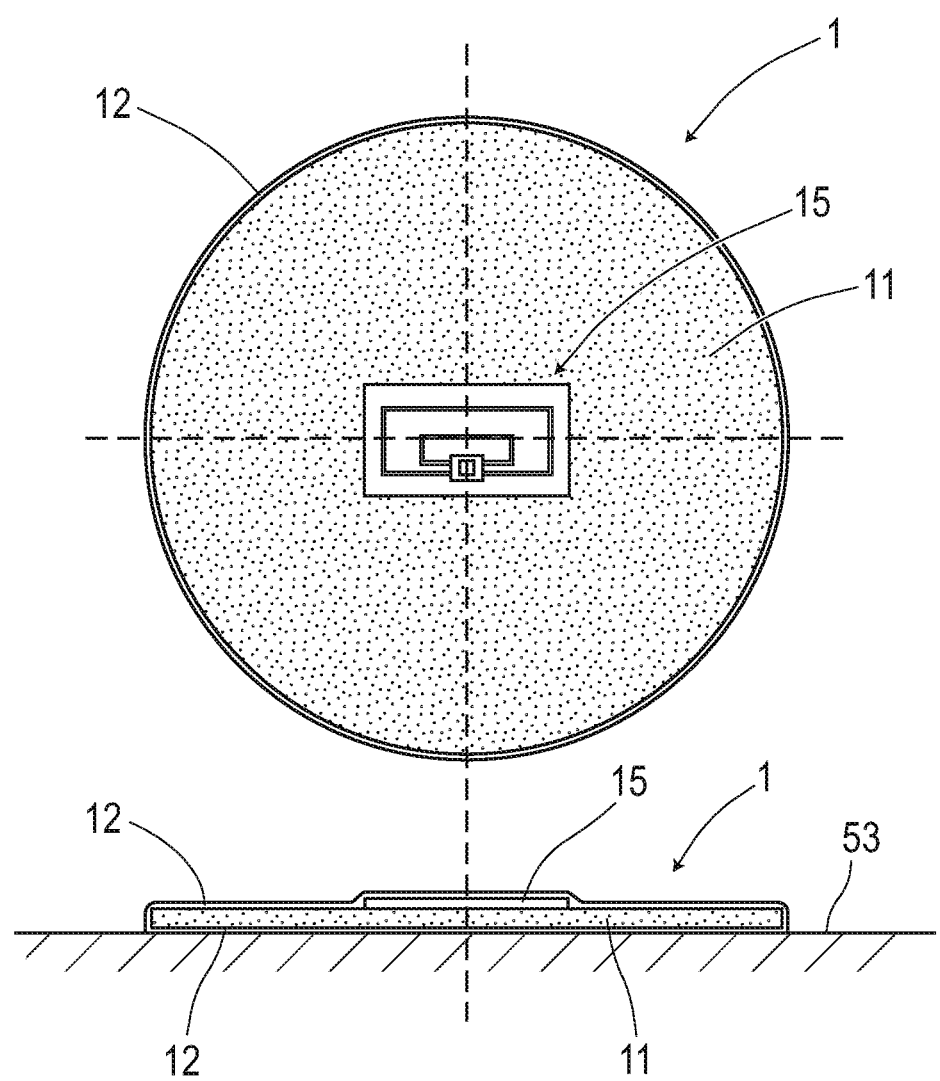
[FIG. 2]

[FIG. 3]
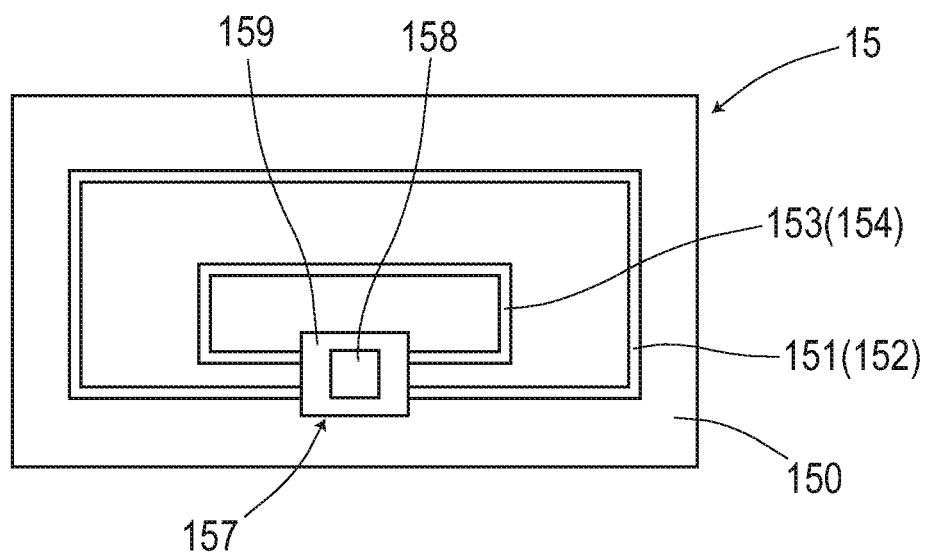

[FIG. 4]
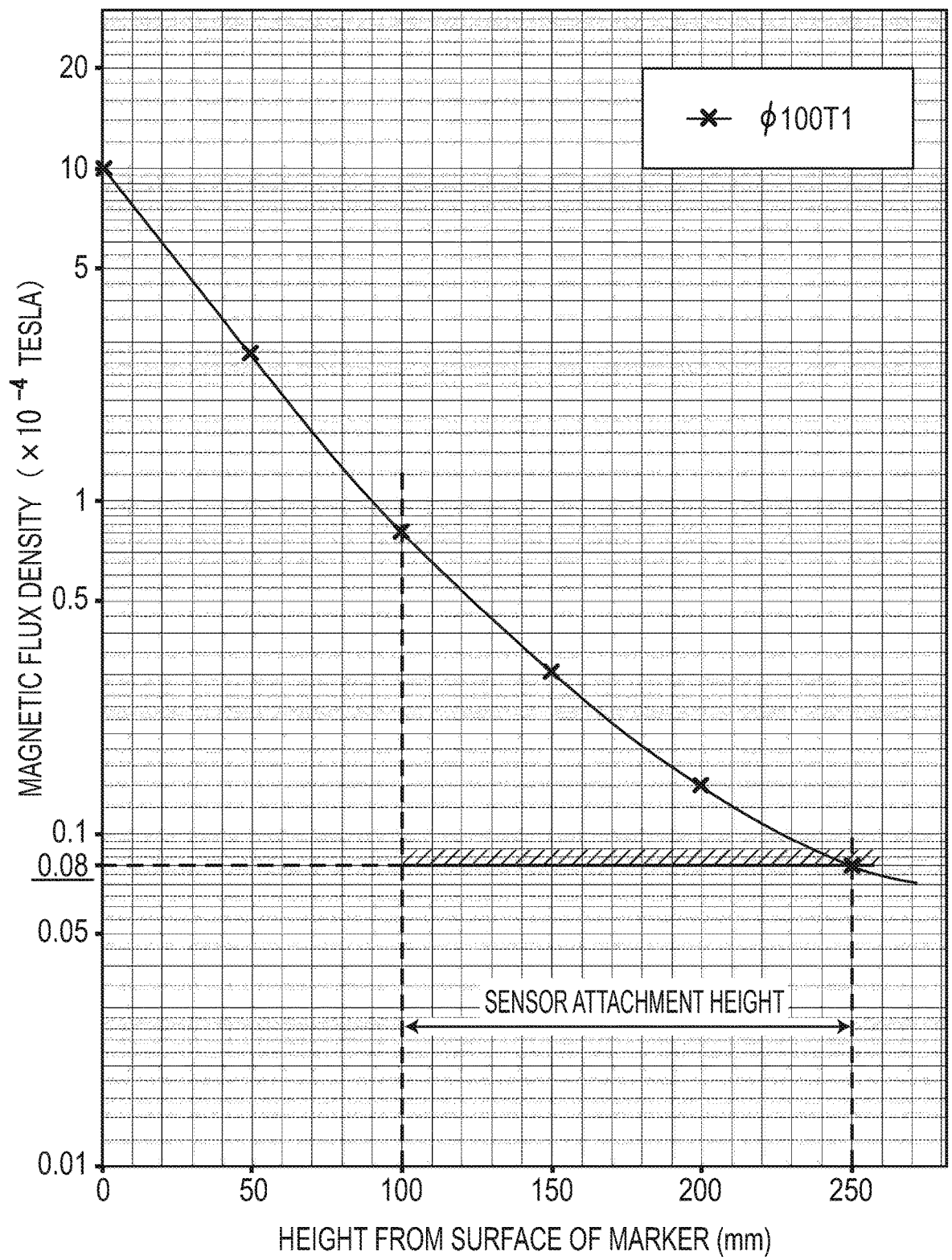

[FIG. 5]
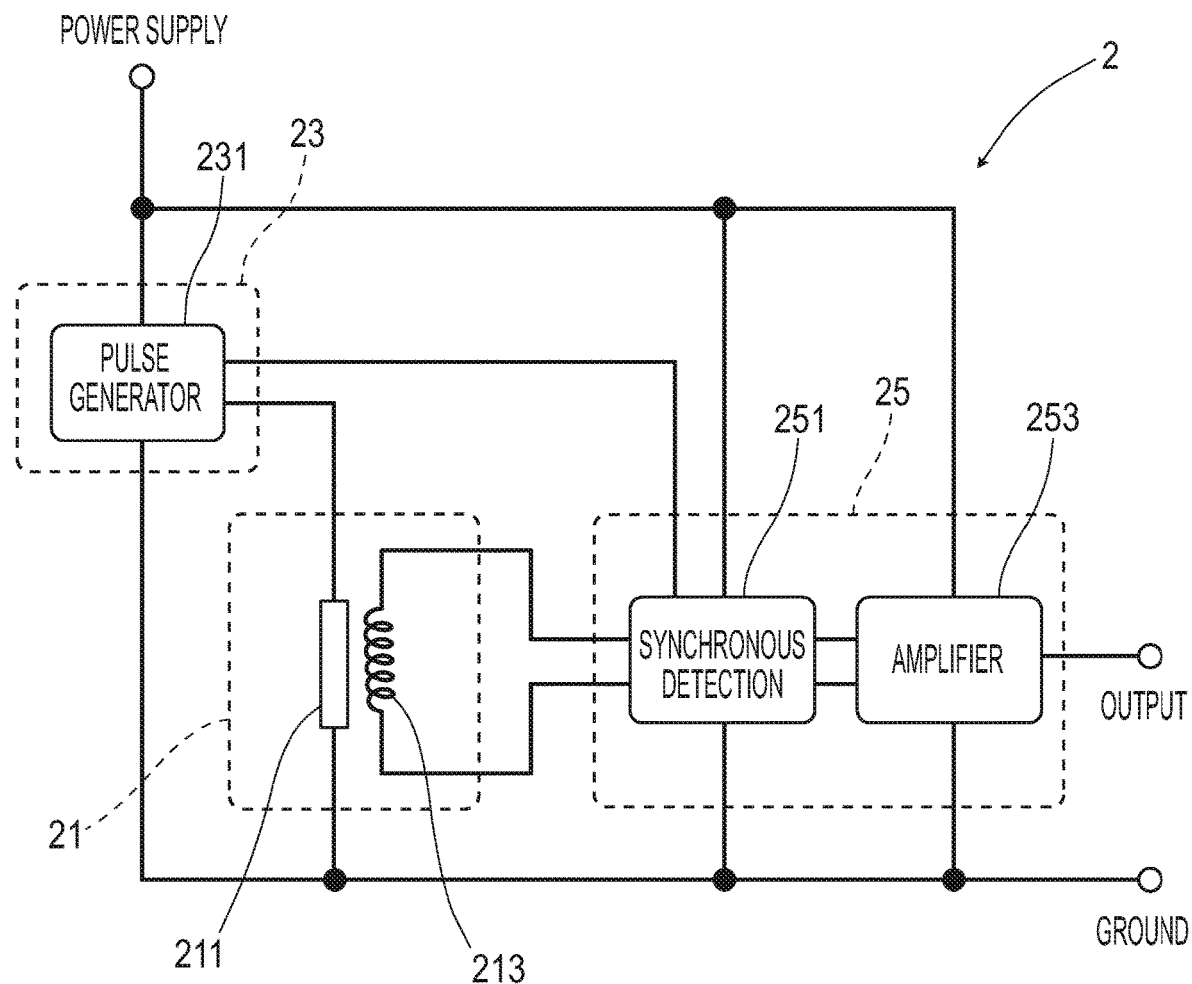

[FIG. 6]
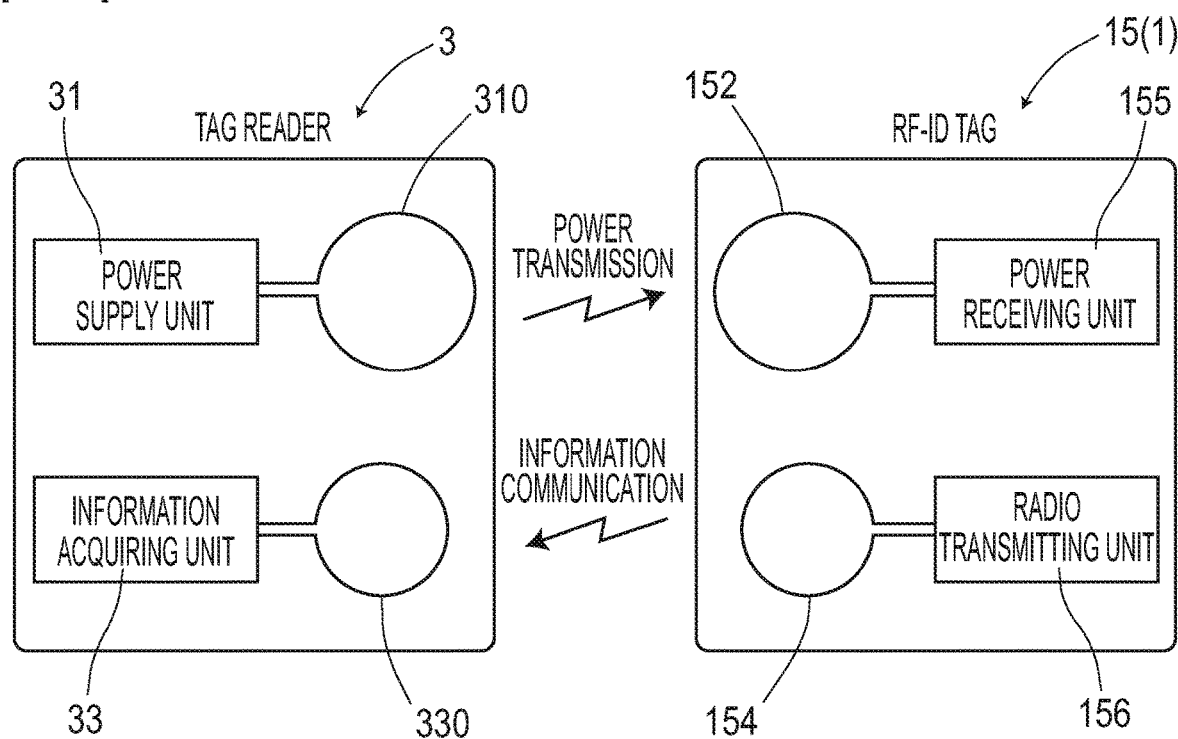

[FIG. 7]
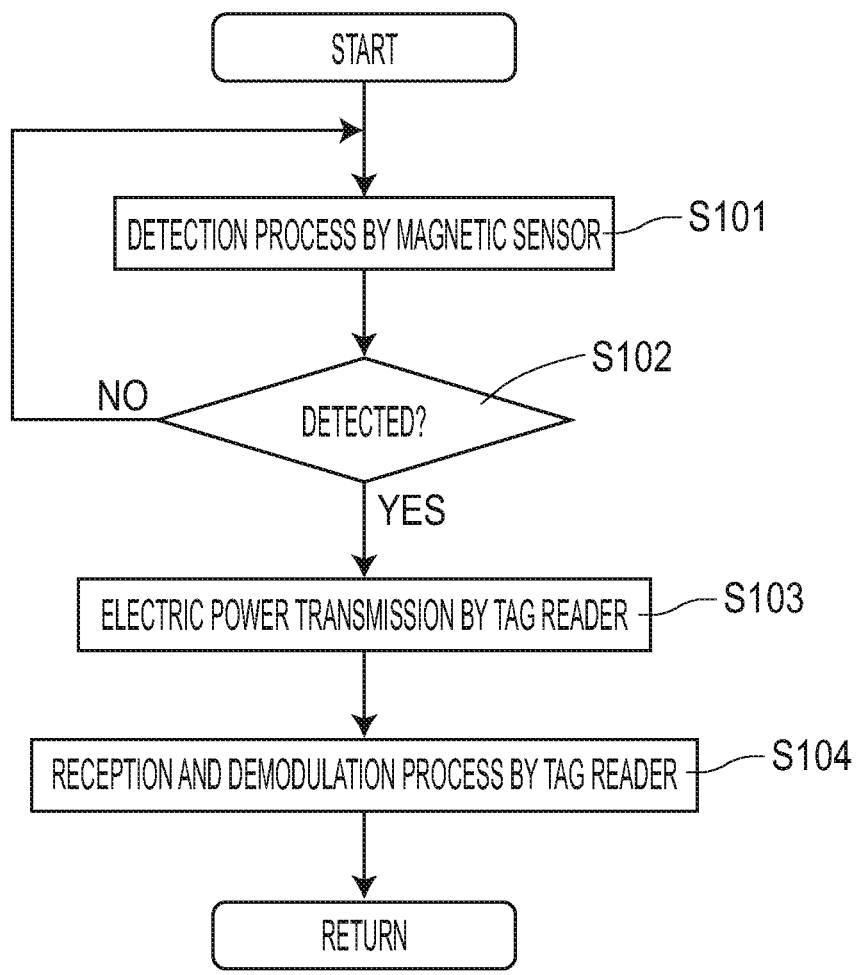

[FIG. 8]
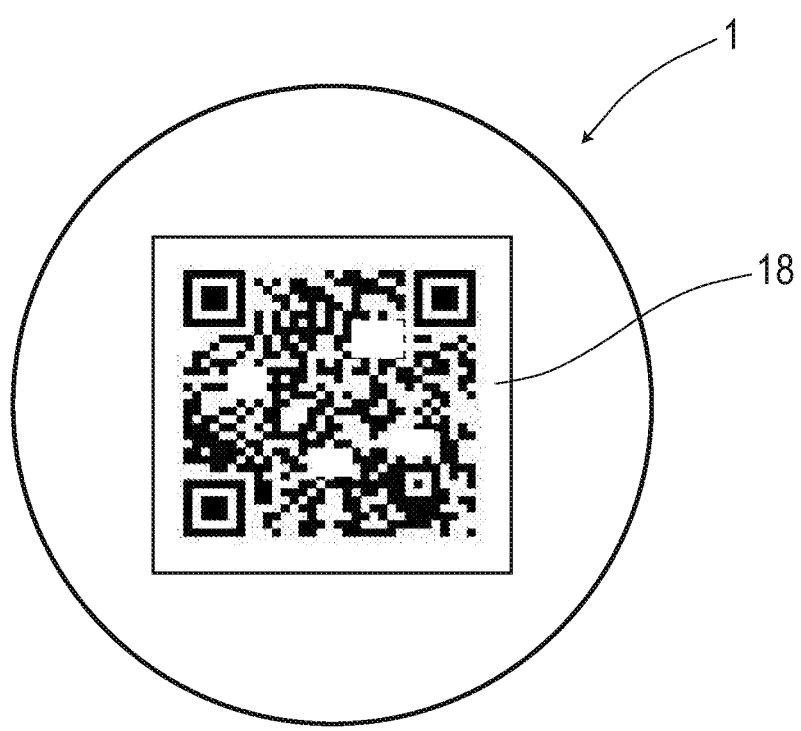

[FIG. 9]
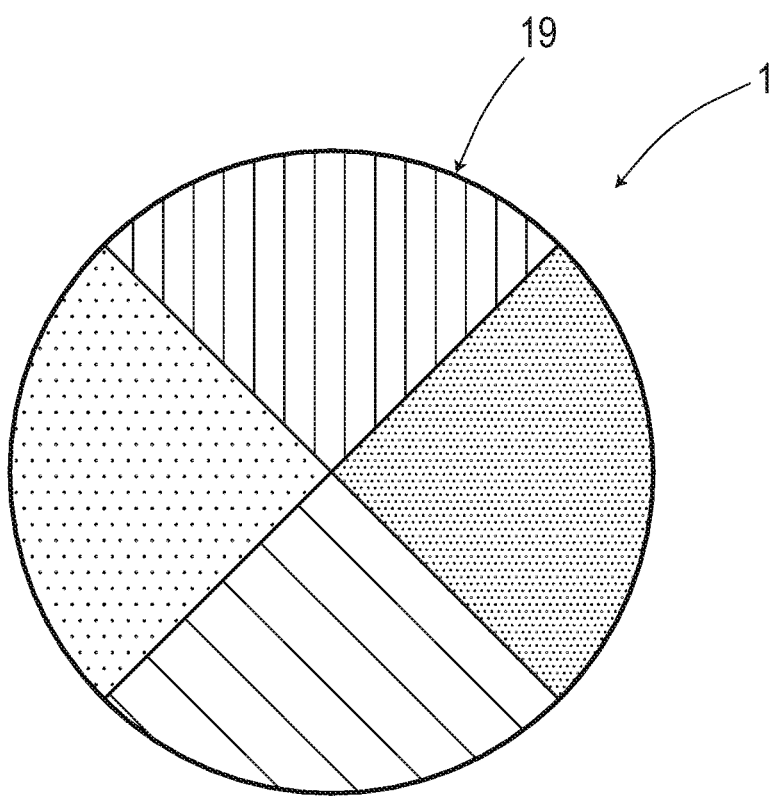

MAGNETIC MARKER AND DRIVING ASSISTANCE SYSTEM

CROSS-REFERENCE TO RELATED APPLICATIONS

This application is a National Stage Application based on PCT/JP2017/013341, filed 30 Mar. 2017, and claims priority to Japanese Patent Application No. 2016-090606 on 28 Apr. 2016, the entire contents of which being incorporated herein by reference.

TECHNICAL FIELD

The present invention relates to a magnetic marker to be laid on a road for assisting driving of a vehicle, and a driving assistance system including the magnetic marker.

BACKGROUND ART

Conventionally, a magnetic marker to be laid on a road so as to be detectable by a magnetic sensor on a vehicle side has been known (for example, refer to Patent Literature 1). By using the magnetic marker, for example, there is a possibility that various driving assists using the magnetic markers laid along a lane, such as automatic steering control and lane departure warning, as well as automatic driving can be achieved.

CITATION LIST

Patent Literature

Patent Literature 1: Japanese Unexamined Patent Application Publication No. 2005-202478

SUMMARY OF INVENTION

Technical Problem

However, there is a problem in which information that can be acquired by detection of the magnetic marker is information about the presence or absence of the magnetic marker, a lateral shift amount in a width direction of a vehicle with respect to the magnetic marker, whether the magnetic polarity is the N pole or the S pole, and so forth and the amount and type of information that can be acquired from a magnetic marker side are not sufficient.

The present invention was made in view of the above-described conventional problem to provide a magnetic marker capable of providing more pieces of information and a driving assistance system using this magnetic marker.

Solution to Problem

A magnetic marker according to the present invention includes a magnetism generating unit which generates a peripheral magnetic field and also an information providing unit which provides information. According to this magnetic marker, more pieces of information can be provided to a vehicle on a detection side.

With a vehicle which corresponds to the magnetic marker according to the present invention and includes an information acquiring unit which acquires the information provided by the magnetic marker, it is possible to acquire more pieces of information from the magnetic marker than information that can be acquired by a magnetic method. With a driving assistance system including a combination of the magnetic marker and the vehicle, by using the information acquired from the magnetic marker, various driving assists can be achieved, for example, presentation of driving assist information based on the acquired information, presentation of warning or the like, vehicle control using the acquired information, and so forth.

BRIEF DESCRIPTION OF DRAWINGS

FIG. 1 is a descriptive diagram of a driving assistance system in a first embodiment.

FIG. 2 depicts an upper surface view and a side surface view of a magnetic marker in the first embodiment.

FIG. 3 is a front view depicting an RFID tag in the first embodiment.

FIG. 4 is a graph depicting a magnetic field distribution of the magnetic marker in a vertical direction in the first embodiment.

FIG. 5 is a block diagram depicting electrical configuration of a magnetic sensor in the first embodiment.

FIG. 6 is a block diagram depicting electrical configuration of the RFID tag and a tag reader in the first embodiment.

FIG. 7 is a flow diagram depicting a flow of operation of a vehicle-mounted unit in the first embodiment.

FIG. 8 is a front view of the magnetic marker in a second embodiment.

FIG. 9 is a front view of the magnetic marker in the second embodiment.

DESCRIPTION OF EMBODIMENT

Suitable aspects of the present invention are described.

The travelling road where the magnetic markers are to be laid may be a public road or a passage in premises such as a shopping center. Furthermore, the travelling road may be a passage in a drive-in multistory parking facility or drive-in underground parking facility in a building such as a shopping center.

The information providing unit may be a radio tag held by the magnetic marker.

In this case, information can be provided to the vehicle side via wireless communication. In wireless communication, an influence is relatively small even if snow accumulation, soil, and so forth are attached or the like on the surface side of the magnetic marker, and information transmission can be made. Note that on the information acquiring unit on the vehicle side, a function of receiving radio waves transmitted from the magnetic marker and demodulating information is preferably provided.

As a mode of holding the radio tag by the magnetic marker, examples include a mode in which a sheet-shaped radio tag is placed on a front surface side or a back surface side of the magnetic marker and a mode in which the radio tag is placed on a side surface side of the magnetic marker. Furthermore, the mode may be such that while part of the radio tag is buried inside the magnetic marker, a radio antenna is placed on the front surface side, the back surface side, or the side surface side of the magnetic marker. Still further, the mode may be such that the entire radio tag is buried and held in the magnetic marker. Note that the front surface side of the magnetic marker is a side oriented upward at the time of laying and the back surface side of the magnetic marker is a side facing the road surface of the travelling road at the time of laying.

The magnetic marker is preferably such that the radio tag is a radio tag using a frequency band of 710 MHz to 960 MHz.

With the radio tag using this frequency band, small-sized and robust wireless communication can be achieved.

The magnetism generating unit preferably has a magnet molded including magnetic powder as a magnetism generation source. For example, when electric power required for operation of the radio tag or the like is wirelessly transmitted by electromagnetic induction or the like, if eddy current occurs in the magnetism generating unit, efficiency of electric power transmission is significantly impaired. With the magnet made by molding the magnetic powder, electrical internal resistance is high, and therefore the eddy current can be reduced and electric power can be efficiently transmitted. Furthermore, for example, if a bond magnet made by mixing magnetic powder into a binder made of a high-polymer material such as rubber or plastic and molding the resultant material is adopted as the magnetism generating unit, a high-frequency loss can be reduced, and therefore affinity with the radio tag using a high-frequency band is favorable.

The information providing unit may be a pictorially readable pattern formed on a surface of the magnetic marker. As a pictorially readable pattern, examples include various pictorially identifiable patterns such as pictorial codes such as a barcode and QR code (registered trademark) and also a type of color, multi-colored pattern, texture (figure), character, and signs. Preferably provided on the information acquiring unit on the vehicle side is a function of pictorially taking an image of the pattern formed on the surface of the magnetic marker and pictorially reading information represented by that pattern.

It can be thought that the information acquired from the magnetic marker is used for such as assisting driving by presenting the information or the processed information to the driver and a driving assist by vehicle to control or the like using that information. As an apparatus which presents the information or the like to the driver, examples include apparatuses such as a display, loudspeaker, alarm, buzzer, vibrator, or the like. As an apparatus for vehicle control, examples include an apparatus for achieving automatic braking, an apparatus which achieves automatic steering, and an apparatus which automatically controls the engine throttle.

The information provided by the information providing unit of the magnetic marker may be position information representing a laying position of the magnetic marker.

In this case, when the vehicle passing through the magnetic marker, the position information representing the laying position of that magnetic marker can be acquired on the vehicle side. This position information is effective information usable for, for example, capturing an own vehicle position on the vehicle side.

The vehicle may include a vehicle-to-vehicle communication apparatus for transmitting and receiving information about an own vehicle position to and from another vehicle based on the position information acquired from the magnetic marker. In this case, the vehicle can grasp the position relation with other peripheral vehicles. If the position relation with other vehicles can be grasped, for example, for driving assist such as automatic braking control, control reliability can be enhanced and safety can be improved. Also, for driving assist such as warning, warning regarding behaviors of a vehicle that cannot be visually recognized by the driver, for example, a preceding vehicle that is two vehicles ahead, can be achieved.

EMBODIMENTS

First Embodiment

The present example is an example regarding a driving assistance system 1S using the magnetic markers 1. Details of this are described with reference to FIG. 1 to FIG. 7.

The driving assistance system 1S for vehicles exemplarily depicted in FIG. 1 is a system by a combination of the magnetic markers 1 laid on a road surface 53 of a travelling road for a vehicle 5, the vehicle 5 including a vehicle-mounted unit 2A including a magnetic sensor 2 and so forth. An output signal of the vehicle-mounted unit 2A attached to a vehicle body floor 50 corresponding to the bottom surface of the vehicle 5 is inputted to, for example, an ECU or the like not depicted on the vehicle 5 side. The output signal of the vehicle-mounted unit 2A, for example, can be used for various driving assists such as automatic steering control for keeping the lane, lane departure warning, route navigation, traffic information display, warning, and automatic driving.

As depicted in FIG. 2, the magnetic marker 1 is a marker which has a flat circular shape having a diameter of 100 mm and a maximum thickness of approximately 2.0 mm and can be bonded and joined to the road surface 53. In this magnetic marker 1, a sheet-shaped RFID tag (Radio Frequency IDentification, radio tag) 15 is laminated on the surface side. The magnetic marker 1 of the present example including the RFID tag 15 can be magnetically detected on the vehicle 5 side and also can provide various information to the vehicle 5 side without depending on a magnetic method.

The magnetic marker 1 is a marker made by covering both front and back surface sides of a flat magnet sheet 11 having a diameter of 100 mm and a thickness of 1 mm with a resin mold 12. The magnet sheet 11 serving as one example of the magnetism generating unit is a sheet of an isotropic ferrite rubber magnet having a maximum energy product (BHmax) of 6.4 kJ/m$^3$. This magnet sheet 11 is a bond magnet made by mixing rubber as a binder into a raw material, magnetic powder of iron oxide, to forma sheet shape.

The sheet-shaped RFID tag 15 having a thickness of 0.5 mm is laminated and placed on the surface of the magnet sheet 11. The resin mold 12 on the front surface side covers the surface side of the magnet sheet 11 where the RFID tag 15 is laminated and placed. The thickness of the resin mold 12 on the front surface side of the magnetic marker 1 is 0.3 mm, and the thickness on the back surface side corresponding to an installation surface of the magnetic marker 1 is 0.2 mm. In the magnetic marker 1, the portion where the RFID tag 15 is placed has a maximum thickness, and the maximum thickness is 2.0 mm including the thickness of the resin mold 12.

Note that it is also preferable that a sheet having a diameter of 100 mm and a thickness of 0.5 mm to 1.0 mm provided with a rectangular placement hole corresponding to the RFID tag 15 is laminated and placed on the surface of the magnet sheet 11 and the RFID tag 15 is positioned at that placement hole. In this case, the thickness of the placement portion of the RFID tag 15 can be made equivalent to or thinner than the other portions. This can reduce loads acting on the RFID tag 15 when the magnetic marker 1 is stepped on by the tire of the vehicle 5 or the like.

Installation of the magnetic marker 1 onto the road surface 53 is performed by, for example, bonding and fixing by a bonding material. Note that the resin mold may be provided also to the outer circumferential side surface of the magnetic marker 1. Furthermore, by laminating a glass cloth or the like on the surface of the magnet sheet 11 where the RFID tag 15 is laminated and impregnating the glass cloth with resin, a glass-fiber-reinforced resin mold may be formed.

As in FIG. 3, the RFID tag 15 serving as one example of an information providing unit is an electronic component having an IC chip 157 implemented on the surface of a tag sheet 150 as a sheet-shaped member. The RFID tag 15 is configured to operate by power supplied via wireless transmission from outside and wirelessly transmit information stored in the IC chip 157.

In particular, the RFID tag 15 of the present example is a radio tag using a 900-MHz band. In this frequency band, the size of the RFID tag 15 can be easily reduced, and robust wireless communication can be achieved due to high radio-wave transmission capability. Note that the magnet sheet 11 as a bond magnet has a characteristic of a small high-frequency loss. Therefore, this magnet sheet 11 has a small degree of attenuating radio waves in the 900-MHz band transmitted by the RFID tag 15, and the fear of inhibiting robustness of wireless communication is small.

The tag sheet 150 is a sheet-shaped member cut out from a PET film. On the surface of the tag sheet 150, a loop coil pattern 151 and an antenna pattern 153, which are printed patterns in conductive ink such as silver paste, are formed. The loop coil pattern 151 and the antenna pattern 153 each assume a substantially annular shape with a notch at one location. In this notched portion, a chip placement area (omitted in the drawing) is formed for placing the IC chip 157. When the IC chip 157 is joined to the tag sheet 150, each of the patterns 151 and 153 is electrically connected to the IC chip 157.

The loop coil pattern 151 is a pattern forming a power receiving coil 152. By electromagnetic induction from outside, an exciting current occurs in this loop coil pattern 151. The antenna pattern 153 is a pattern forming a transmission antenna 154 for wirelessly transmitting information. The power receiving coil 152 formed of the loop coil pattern 151 and the transmission antenna 154 formed of the antenna pattern 153 each have sensitivity to a vertical direction of its formation surface. The specifications of this sensitivity are suitable for communication with the vehicle-mounted unit 2A attached to the vehicle body floor 50 of the vehicle 5 and so forth. Note that as a conductive ink for printing each of the patterns 151 and 153, silver paste as well as graphite paste, silver chloride paste, copper paste, nickel paste, and so forth can be used. Furthermore, each of the patterns 151 and 153 can be formed by copper etching or the like.

The IC chip 157 is an electronic component having a semiconductor element 158 including a ROM, RAM, and so forth as memory unit implemented on the surface of a sheet-shaped base material 159. The RFID tag 15 is fabricated by affixing this IC chip 157 to the surface of the above-described tag sheet 150. For affixing the IC chip 157 of an interposer type provided with an electrode not depicted, any of various joining methods can be adopted, such as a conductive bonding material, ultrasonic bonding, and caulked joint. Note that the electrical configuration of the RFID tag 15 will be described further below with reference to a block diagram of FIG. 6.

As the tag sheet 150 of the RFID tag 15 and the base material 159 of the IC chip 157, a resin film made of polyethylene (PE), polyethylene terephthalate (PET), polypropylene (PP), or the like, paper, or the like can be adopted. Furthermore, the above-described IC chip 157 may be a semiconductor element itself, or a chip having a semiconductor element packaged by plastic resin or the like.

Here, shape specifications and magnetic specifications of the magnet sheet 11 included in the magnetic marker 1 of the present example are partially depicted in Table 1.

TABLE 1

| Magnet type | Ferrite rubber magnet |
|---|---|
| Outer diameter | ø 100 mm |
| Thickness | 1.0 mm (except resin mold) |
| Magnetic flux density Gs of the surface | 1 mT |

A magnetic field distribution in a vertical direction of the magnetic marker 1 is as depicted in FIG. 4. The drawing is a semilogarithmic graph depicting the result of a computer simulation performed by the axisymmetric three-dimensional magneto-static analysis using the finite-element method. Note that, in performing this computer simulation, a simulation program with its simulation accuracy confirmed in advance by a demonstration experiment is used. Furthermore, as for part of data depicted in the drawing, it has been confirmed by a demonstration experiment that simulation values are correct.

In FIG. 4, a logarithmic scale of the magnetic flux density of magnetism acting in the vertical direction is set on the vertical axis and the height in the vertical direction with reference to the surface of the magnetic marker 1 (height from the surface of the marker) is set on the horizontal axis. In the drawing, the magnetic flux density when the height from the surface of the marker=0 mm is the "magnetic flux density Gs of the surface" in Table 1. In this magnetic marker 1, in a range of 100 mm to 250 mm assumed as attachment heights of the magnetic sensor 2, the magnetic flux density equal to or larger than 8 microtesla is ensured.

Next, the vehicle 5 on a side of detecting the magnetic marker 1 and so forth is described. This vehicle 5 includes the vehicle-mounted unit 2A (FIG. 1) including the magnetic sensor 2 of FIG. 5 which magnetically detects the magnetic marker 1 and a tag reader 3 of FIG. 6 which acquires information from the magnetic marker 1. The vehicle-mounted unit 2A is attached to the vehicle body floor 50 forming as the bottom surface of the vehicle so as to be able to, for example, detect the magnetic marker 1 laid on the road surface 53. The attachment height of the vehicle-mounted unit 2A varies depending on the vehicle type, in a range of 100 mm to 250 mm. In the following, the magnetic sensor 2 and the tag reader configuring the vehicle-mounted unit 2A are sequentially described.

(Magnetic Sensor)

The magnetic sensor 2 serving as one example of a magnetism detecting unit is a MI (Magnet Impedance) sensor of one chip, with a MI element 21 and a drive circuit integrated together, as depicted in the block diagram of FIG. 5. The MI element 21 is an element including an amorphous wire (one example of a magneto-sensitive body) 211 made of a CoFeSiB-based alloy with approximately zero magnetostriction and a pickup coil 213 wound around the periphery of this amorphous wire 211. The magnetic sensor 2 measures an induced voltage of the pickup coil 213 when a pulse current is applied to the amorphous wire 211 to detect magnetism acting on the amorphous wire 211 as the magneto-sensitive body.

The drive circuit is configured to include a pulse circuit 23 which supplies a pulse current to the amorphous wire 211 and a signal processing circuit 25 which samples and outputs the induced voltage of the pickup coil 213 at a predetermined timing. The pulse circuit 23 is a circuit including a pulse generator 231 which generates a pulse signal as a source of the pulse current. The signal processing circuit 25 is a circuit which retrieves the induced voltage of the pickup coil 213 via a synchronous detection 251 which is opened and closed in step with the pulse signal and performs amplification at a predetermined amplification factor by an amplifier 253. The signal amplified by this signal processing circuit 25 is outputted to outside as a sensor signal.

Specifications of this magnetic sensor 2 are partially depicted in Table 2.

TABLE 2

| Measurement range | ±0.6 mT |
|---|---|
| Magnetic flux resolution | 0.02 μT |
| Sampling period | 3 kHz |

The magnetic sensor 2 is a high-sensitivity sensor with a measurement range of magnetic flux density of ±0.6 millitesla and a magnetic flux resolution within the measurement range of 0.02 microtesla. This high sensitivity is achieved by the MI element 21 using an MI effect in which the impedance of the amorphous wire 211 changes with sensibility in accordance with the outer magnetic field. According to the magnetic sensor 2 with a magnetic flux resolution of 0.02 microtesla (refer to Table 2), it is possible to reliably detect the magnetic marker 1 acting with magnetism with at least a magnetic flux density of 8 microtesla (refer to FIG. 4) in 100 mm to 250 mm, which is in an assumed range of the attachment height. Furthermore, this magnetic sensor 2 can perform high-speed sampling at a period of 3 kHz, and also supports high-speed travelling of the vehicle.

(Tag Reader)

The tag reader 3 serving as one example of an information acquiring unit is configured to include, as in FIG. 6, a power supply unit 31 which supplies power to the RFID tag 15 included in the magnetic marker 1 and an information acquiring unit 33 which acquires information wirelessly transmitted by the RFID tag 15. The power supply unit 31 is an electronic circuit which supplies an electric current to the loop coil 310 to generate a magnetic field and transmits electric power by electromagnetic induction. The information acquiring unit 33 is an electronic circuit which receives radio waves transmitted by the RFID tag 15 by using a loop antenna 330 and retrieves information by demodulation.

With an exciting current generated in the power receiving coil 152 on the RFID tag 15 side by electromagnetic induction due to the magnetic field generated by the loop coil 310, the tag reader 3 transmits electric power and causes a power receiving unit 155 on the RFID tag 15 side to store electric power. On the RFID tag 15 side, upon reception of supply of electric power from the power receiving unit 155, a wireless transmitting unit 156 operates, and transmits various information to the vehicle 5 side via the transmission antenna 154. Also, a dedicated work vehicle having vehicle-mounted thereon a reader/writer including a data write function can write new information to the RAM and rewrite data.

Next, the operation of the vehicle-mounted unit 2A in the driving assistance system 1S is described with reference to the flow diagram of FIG. 7.

During travelling of the vehicle 5, a process of detecting the magnetic marker 1 is repeatedly performed by using the magnetic sensor 2 of the vehicle-mounted unit 2A (S101).

When the magnetic marker 1 is detected by the magnetic sensor 2 (S102: YES), the vehicle-mounted unit 2A causes the tag reader 3 to perform electric power transmission, thereby supplying operating power to the RFID tag 15 of the magnetic marker 1 (S103). The vehicle-mounted unit 2A causes the tag reader 3 to start a reception and demodulation process in synchronization with wireless transmission started in response to the operation of the RFID tag 15 (S104), and acquires information transmitted by the RFID tag 15.

Note that as information to be provided by the RFID tag 15 included in the magnetic marker 1 to the vehicle 5 side, for example, the following (1) position information, (2) height information, (3) traffic information, and so forth can be exemplarily provided. Note that according to magnetic detection of the magnetic marker 1, information can be acquired such as the presence or absence of the magnetic marker 1, a lateral shift amount in the vehicle width direction of the vehicle 5 when passing through the magnetic marker 1, and these information can be applied to various driving assists such as lane departure warning, automatic steering, lane departure avoiding control, and automatic driving.

(1) Two-Dimensional Position Information

If two-dimensional position information is provided to the vehicle 5 side, accurate position information can be acquired on the vehicle 5 side without depending on positioning unit such as, for example, GPS (Global Positioning System), and a navigation system can be achieved. Also, when the vehicle 5 is positioned midway between the magnetic markers 1 adjacent to each other in the travelling direction of the vehicle 5, it is preferable that the vehicle position is estimated by autonomous navigation using measurement values such as a vehicle speed and a yaw rate and an accurate position is acquired every time the vehicle passes through the magnetic marker 1.

A combination with a navigation system having positioning unit such as GPS is also effective. If the magnetic marker 1 capable of providing position information is laid at a location such as a tunnel or between buildings where GPS radio waves are not receivable or tend to become unstable, a faulty state in receiving GPS radio waves can be backed up, and position capturing accuracy by the navigation system can be improved.

(2) Height Information (Three-Dimensional Position Information)

For example, the magnetic markers 1 may be laid in advance on a passage in a drive-in multistory parking facility or the like in a shopping center or the like, and height information such as a floor number may be provided to the vehicle 5 side. For example, in GPS or the like, it is not easy to identify a floor number inside a building. When the floor number where the vehicle resides is unknown, even if vacant slot information identified with the floor number is provided from an infrastructure side, it is difficult to accurately perform a route guide to that vacant slot. With height information with which the floor number can be identified is present, it is possible to accurately perform a road guide to a vacant slot in a drive-in multistory parking facility.

(3) Traffic Information

Traffic information such as information about intersections, information about branching roads, and information about merging roads may be provided to the vehicle 5 side. For example, the magnetic marker 1 may be set at a feature point on the road (travelling road) such as an intersection, branching road, or merging road, and information about the type of its corresponding road shape may be provided from the magnetic marker 1 side. Driving assists using traffic information include presentation of traffic information by a display for calling a driver's attention, a warning sound, or the like and various driving assist controls such as brake control and steering control. For example, if a distance between the stop line of an intersection and the magnetic marker 1 is defined, brake control for stopping at the stop line can be accurately performed. Also, if a distance between the start position of a branching road and the magnetic marker 1 is defined, driving assist control for branching at the branching road can be accurately performed. Note that information about the distances between intersections or branching roads and the magnetic markers 1 may be included in the information transmitted from the RFID tag 15.

As described above, the magnetic marker 1 configuring the driving assistance system 1S of the present example includes the RFID tag 15 as an information providing unit. On the vehicle 5 side, by detecting the magnetic marker 1 by a magnetic method, it is possible to, for example, detect the presence or absence of the magnetic marker 1 and a lateral shift amount in the vehicle width direction of the vehicle 5, and also information useful for driving assist can be acquired from the magnetic marker 1. With the driving assistance system 1S in which the high-functionality magnetic marker 1 including the RFID tag 15 is laid on a travelling road, it is possible to achieve various driving assists including automatic driving by utilizing the magnetic marker 1.

Note that in the magnetic marker 1 of the present example, the magnetic flux density Gs of the surface is reduced to 1 millitesla while the magnetic characteristics detectable by the magnetic sensor 2 are ensured. This magnetic flux density of 1 millitesla is further smaller than, for example, $\frac{1}{10}$ of the magnetic flux density on the order of 20 millitesla to 40 millitesla of the surface of a magnet sheet to be affixed to a whiteboard, a door of a refrigerator, or the like. The magnetic marker 1 has a very weak magnetic force even compared with this magnet sheet for office or household use.

As described above, if the magnetic field generated by the magnetic marker 1 is very weak, efficiency of electromagnetic induction when electric power is transmitted from the vehicle 5 side can be enhanced, and reliability and efficiency of electric power transmission can be ensured. Also, the RFID tag 15 and the tag reader 3 each adopt a loop-shaped magnetic field antenna for detecting magnetic field components and so forth as the antennas 154 and 330 for information transmission and reception. If the peripheral magnetic field is large, there is a possibility of occurrence of an influence on information transmission and reception. However, if the magnetic field generated by the magnetic marker 1 is very weak, the fear of impairment of reliability of wireless communication is small.

Note in the present example that an isotropic ferrite rubber magnet, which is a bond magnet made by mixing rubber as a binder into a magnetic powder of iron oxide, is exemplarily described as the magnet sheet 11 serving as a magnetism generating unit of the magnetic marker 1. The magnet of the magnetic marker may be a bond magnet such as a plastic magnet made by mixing a raw material, magnetic powder of iron oxide, into a plastic as a binder and dissolving and then molding the resultant material with a metal mold, or may be a sintered magnet made by sintering a raw material, or the like.

The ferrite magnet serving as the magnet sheet 11 has a characteristic of large electrical resistance. Therefore, when electric power is transmitted by electromagnetic induction, the fear of occurrence of eddy current on the surface of the magnet sheet 11 is small, and transmission efficiency at the time of wireless transmission of electric power can be ensured. Also, in the magnet sheet 11, which is a bond magnet made by crushing a magnet and mixing the magnet into rubber as a binder, the crushed magnet is bounded by the binder as an insulator, and electrical resistance is very large. Therefore, with this magnet sheet 11, the fear of occurrence of a high-frequency loss is hardly present when the RFID tag 15 performs wireless communication.

With the magnet sheet 11 formed of a bond magnet with a small high-frequency loss, attenuation of radio waves can be avoided, and therefore flexibility in placement of the RFID tag 15 can be enhanced. For example, placement can be made in a manner such that: the RFID tag 15 is placed so as to be affixed to the front surface, back surface, or side surface of the magnet sheet 11 or the magnetic marker 1; the RFID tag 15 is placed inside the magnet sheet 11 or the magnetic marker 1; and the RFID tag 15 is placed on a lower side of the magnetic marker 1.

When a bond magnet with a small high-frequency loss is adopted as a magnet of the magnetic marker, a high frequency equal to or higher than 100 kHz can be selected as a carrier frequency of wireless communication by the RFID tag 15. If the carrier frequency is a high frequency, it is easy to decrease the size of the RFID tag. In particular, for example, if a carrier frequency of a 900-MHz band is used, transmission capability is high, and therefore it is relatively easy to ensure communication stability and robustness can be improved.

As described above, when a bond magnet with small high-frequency loss such as a rubber magnet or plastic magnet is adopted as a magnet of the magnetic marker, for example, the carrier frequency in the 900-MHz band is adopted, thereby achieving robustness in wireless communication and downsizing of the RFID tag at the same time. Note that a similar effect can be expected with an RFID tag using a frequency band from 710 MHz to 960 MHz.

As the magnetic sensor 2, a sensor using the MI element 21 is exemplarily described. As a magnetic sensor, a magnetic sensor having sensitivity capable of detecting the magnetic marker 1 in a range of 100 mm to 250 mm assumed as its attachment height can be used, and is not limited to a magnetic sensor using the MI element 21. For example, a magnetic sensor of another type such as a flux gate sensor or a TMR sensor can also be adopted. When two or more magnetic sensors are used, two types or more of the MI sensor, the flux gate sensor, and the TMR sensor can be combined for adoption. The position the magnetic sensor set in the vehicle is at a distance on the order of at least 100 mm from the road surface of the road. As the magnetic sensor, it is required to adopt a sensor having a capability of easily detecting magnetism generated by the magnetic marker 1 placed on the road surface.

The type of the magnetic material and the magnet of the magnet sheet 11 configuring the magnetic marker 1 are not limited to the present example. As a type of the magnetic material and the magnet, any of various materials and types can be adopted. It is preferable that appropriate magnetic material and type are selectively determined in accordance with magnetic specifications and environmental specifications required for the magnetic marker 1.

Note that as for the RFID tag 15 and the tag reader 3, an antenna for electric power transmission and an antenna for transmitting or receiving information can be used in a shared manner.

While the RFID tag 15 is provided on the front surface side of the magnetic marker 1 in the present example, the RFID tag 15 may be provided on the back surface side. When the magnetic marker 1 is laid on the road surface, the RFID tag 15 is positioned on the back side of a main body of the magnetic marker 1. For example, even if the magnetic marker 1 is stepped by the vehicle tire, the RFID tag 15 can be protected by the main body of the magnetic marker 1, and therefore the configuration of protecting the RFID tag 15 can be simplified.

In the present example, after the RFID tag 15 is laminated and placed on the surface of the magnet sheet 11, a layer of the resin mold 12 is formed on the front surface side of the magnet sheet 11. In place of this, the RFID tag may be laminated and placed on the surface of the magnetic marker 1 after the resin mold layer is formed. The same goes for the case in which the RFID tag is placed on the back surface side or the side surface side of the magnetic marker 1.

If it is configured that the magnetic marker 1 provides the two-dimensional position information to the vehicle 5 side, a vehicle-to-vehicle communication apparatus capable of mutual communication between the vehicles 5 may be provided to each vehicle 5. In this case, each vehicle 5 on the road can wirelessly transmit and receive position information to and from another. If each vehicle 5 can grasp the position relation with other peripheral vehicles, safety and accuracy in vehicle control for driving assist including automatic driving can be improved. As position information about its own vehicle position to be exchanged among the vehicles, position information based on the position information provided from the magnetic marker 1 may be used. For example, position information with a corrected lateral shift amount in the vehicle width direction of the own vehicle with respect to the magnetic marker 1 may be set as an own vehicle position, or position information including travelling information by autonomous navigation after passing through the magnetic marker 1 may be set as an own vehicle position.

Furthermore, if travelling information such as speed information and acceleration information is exchanged via vehicle-to-vehicle communication in addition to the position information, it is possible to grasp the position relation with other peripheral vehicles and behaviors of the other vehicles. In this case, for example, when a preceding vehicle that is two vehicles ahead pulls on brakes, whether evading brake control is required can be appropriately determined, thereby enhancing accuracy of vehicle control and improving safety. Also, a driving assist can be made, such as, for example, alarming when the vehicle that is two vehicles ahead pulls on brakes.

In the present example, the sheet-shaped magnetic marker 1 is exemplarily described as a magnetic marker. The shape of the magnetic marker may be a columnar shape having a circular cross section, polygon cross section, or the like. As a combination of the height and the outer diameter of the columnar-shaped magnetic marker, the magnetic marker may have a slender columnar shape with the height dimension being longer than the outer diameter, or a short columnar shape with the outer diameter dimension being longer than the height. For example, the magnetic marker may have a cylinder shape having a height of 10 mm to 20 mm and a diameter of 25 mm to 30 mm. Note that in the case of this cylinder-shaped magnetic marker, a ferrite plastic magnet, which is one type of bond magnets, is preferably adopted.

When a columnar-shaped magnetic marker is laid, an accommodation space such as a recess or hole for accommodating the magnetic marker is preferably formed in advance in the road. As for the accommodation space, a large dimension in a depth direction is preferably ensured with respect to the height of the magnetic marker. In this case, the upper end face of the magnetic marker placed in the accommodation space is lower than the road surface. For example, it is preferable to preform sealing by filling with a methacrylate-resin-based filler to enhance uniformity with the peripheral road surface. Note that asphalt may be adopted as a filler.

Furthermore, in filling with the filler, a woven fabric or nonwoven fabric made of glass fiber, carbon fiber, cellulose nanofiber, or the like may be placed on the upper end face side of the magnetic marker. In this case, with the woven fabric or non-woven fabric impregnated with the filler, the characteristics of the filler can be reinforced. The size of the woven fabric or non-woven fabric may be smaller than the cross-sectional shape of the accommodation space, or may be one size larger than the cross-sectional shape of the accommodation space. A woven fabric or the like larger than the cross-sectional shape of the accommodation space can integrally cover the magnetic marker and the road surface around the accommodation space together. In this case, an opening portion of the accommodation space can be protected integrally with the peripheral road surface. For example, a depression or the like at the opening portion of the accommodation space can be reduced, and a favorable laying state of the magnetic marker can be maintained for a long time in the operation of the road over a long period of time.

Second Embodiment

The present example is an example in which the magnetic marker 1 having an pictorial pattern formed on a surface side is adopted in place of the magnetic marker of the first embodiment. Details of this are described with reference to FIG. 8 and FIG. 9.

The shape specifications and the magnetic specifications of the magnetic marker 1 of FIG. 8 are similar to those of the first embodiment, and a surface treatment with a resin mold or the like is also similar. A different point is that the RFID tag 15 is not laminated or placed on the surface side and a code image 18, which is a pictorial pattern serving as one example of the information providing unit, is formed instead by printing or the like. Also, the vehicle-mounted unit configuring the driving assistance system of the present example includes a combination (omitted in the drawing) of a camera which takes an image of the road surface 53 and an image ECU which performs image processing on the taken image of the magnetic marker 1 to read information from the code image 18, the combination being taken as one example of the information acquiring unit, in place of the tag reader of the first embodiment.

In the magnetic marker 1 of FIG. 8, for example, a film having the code image 18 such as, for example, a barcode or QR code (registered trademark) printed thereon is laminated and placed on the surface of the magnet sheet 11, and a transparent resin mold layer is further laminated on that surface.

The camera on the vehicle 5 side is attached with the lens oriented downward so as to be able to take an image of the surface of the magnetic marker 1 laid on the road surface 53. The image ECU is configured to capture the image taken by the camera and perform image processing if the magnetic marker 1 has been magnetically detected and performs cutting-out of a code image area and reading of information represented by the code image 18.

Note that in place of the present example, the code image may be printed or the like directly on the surface of the resin mold covering the surface side of the magnet sheet 11. In this case, a transparent protective layer may be provided on the surface side of the code image. Also, a code image having asperities, for example, with white convex portions and black concave portions, may be formed.

Also, for example, a white sheet with holes provided only to black portions in the code image may cover the magnet sheet 11 so that the black portions of the magnet sheet 11 can be externally seen through the holes, thereby displaying the code image by contrast with the white portions of the white sheet.

Note that any of color patterns may be displayed in place of the code image. The color patterns include a pattern of a single color type and a multi-colored pattern. In the case of a single color, it can be thought that, for example, a safe location is displayed in blue and a dangerous location with many accidents is in red, or an intersection is in red, a merging road is in yellow, and a branching road is in blue. As a multi-colored pattern, for example, as depicted in FIG. 9, information may be represented by a multi-colored pattern 19 with four areas divided by angle.

Also, if the information amount providable by the magnetic marker 1 at one location is not sufficient for a purpose, pictorial patterns of a plurality of, such as two, magnetic markers 1 adjacent to each other in the travelling direction of the vehicle 5 can be combined to represent one piece of information.

Note that other configurations and operations and effects are similar to those of the first embodiment.

While the specific examples of the present invention have been described above in detail as in the above embodiments, these specific examples merely describe examples of technologies included in the claims. Needless to say, the claims should not be restrictively construed by the structures, numerical values, and so forth of the specific examples. The claims include technologies obtained by variously modifying, changing, and combining the specific examples as appropriate by using known technologies, knowledge by people skilled in the art, and so forth.

REFERENCE SIGNS LIST

1 magnetic marker
1S driving assistance system
11 magnet sheet (magnetism generating unit)
12 resin mold
15 RFID tag (radio tag, information providing unit)
18 code image (information providing unit)
19 multi-colored pattern (information providing unit)
2A vehicle-mounted unit
2 magnetic sensor (magnetism detecting unit)
21 MI element
3 tag reader (information acquiring unit)
5 vehicle
50 vehicle body floor (bottom surface)
53 road surface

The invention claimed is:

1. A driving assistance system, comprising:
 a magnetic marker including
  a magnet which generates a magnetic field, and
  a radio tag which provides information to a vehicle side, wherein the magnetic marker is to be laid in or on a travelling road so as to be detectable by a magnetic sensor attached to a vehicle to achieve drive assist control of the vehicle using magnetism generated by the magnet, the magnet has a flat circular shape, the magnet is a sheet of an isotropic ferrite rubber bond magnet, which is a permanent magnet made by including a magnetic powder of iron oxide into a binder made of a high-polymer material, the radio tag and the magnet are integrated together by placing the radio tag directly on at least a center of a surface of the magnet with the flat circular shape, the radio tag uses a frequency band of 710 MHZ to 960 MHz, the radio tag is sheet-shaped and laminated on the surface of the magnet, and a thickness of the magnet is larger than a thickness of the radio tag; and a vehicle including
  vehicle-mounted circuitry including
   a magnetic sensor which magnetically detects the magnetic marker, and
   a radio tag reader which acquires information provided by the radio tag, wherein
  the vehicle-mounted circuitry is configured to
   determine whether the magnetic marker has been detected by the magnetic sensor,
   supply operating power to the radio tag in response to determining the magnetic marker has been detected by the magnetic sensor, and
   cause the radio tag reader to start acquiring the information provided by the radio tag that has been supplied with the operating power.

2. The driving assistance system according to claim 1, wherein the vehicle includes circuitry configured to assist driving by controlling the information acquired from the magnetic marker to be presented to a driver.

3. The driving assistance system according to claim 1, wherein the vehicle includes circuitry configured to control the vehicle by using the information acquired from the magnetic marker.

4. The driving assistance system according to claim 1, wherein the vehicle includes circuitry configured to control the vehicle by using the information acquired from the magnetic marker.

5. The driving assistance system according to claim 2, wherein the information provided by the radio tag is position information representing a laying position of the magnetic marker.

6. The driving assistance system according to claim 2, wherein the information provided by the radio tag is position information representing a laying position of the magnetic marker.

7. The driving assistance system according to claim 3, wherein the information provided by the radio tag is position information representing a laying position of the magnetic marker.

8. The driving assistance system according to claim 4, wherein the information provided by the radio tag is position information representing a laying position of the magnetic marker.

9. The driving assistance system according to claim 5, wherein the vehicle includes vehicle-to-vehicle communication circuitry configured to control transmitting and receiving information about an own vehicle position to and from another vehicle based on the position information acquired from the magnetic marker.

10. The driving assistance system according to claim 6, wherein the vehicle includes vehicle-to-vehicle communication circuitry configured to control transmitting and receiving information about an own vehicle position to and from another vehicle based on the position information acquired from the magnetic marker.

11. The driving assistance system according to claim 1, wherein the radio tag is sheet-shaped and laminated on a surface side of the magnetic marker in which the radio tag is laminated.

12. The driving assistance system according to claim 7, wherein the vehicle includes vehicle-to-vehicle communication circuitry configured to control transmitting and receiving information about an own vehicle position to and from another vehicle based on the position information acquired from the magnetic marker.

13. The driving assistance system according to claim 1, wherein the magnetic powder is a magnetic powder of an iron oxide.

14. The driving assistance system according to claim 1, wherein the magnet has a maximum energy product (BHmax) of 6.4 kJ/m3 or less.

15. The driving assistance system according to claim 1, wherein the radio tag and the magnet are integrated together by placing the radio tag directly on the center of the surface of the magnet.

16. The driving assistance system according to claim 1, wherein the magnetic marker is configured to provide height information indicating a height where the magnetic marker is located.

17. The driving assistance system according to claim 1, wherein the height information indicates a floor number where the magnetic marker is located.

18. The driving assistance system according to claim 1, wherein each of a surface side of the magnetic marker in which the radio tag is laminated and an opposite side of the magnetic marker is covered with a resin mold.

19. The driving assistance system according to claim 18, wherein the magnetic marker is covered with the resin mold entirely.

20. The driving assistance system according to claim 18, wherein a thickness of the magnetic marker, including a thickness of the resin mold, is less than or equal to 2.0 mm.

21. The driving assistance system according to claim 18, wherein a thickness of the resin mold is larger than the thickness of the radio tag.

22. The driving assistance system according to claim 1, wherein the radio tag includes a loop coil pattern and an antenna pattern, which are printed patterns in conductive ink.

23. The driving assistance system according to claim 22, wherein each of the loop coil pattern and the antenna pattern has a substantially annular shape with a notch at a location of the substantial annular shape.

24. The driving assistance system according to claim 1, wherein
the vehicle-mounted circuitry is configured to supply the operating power to the radio tag only when the vehicle-mounted circuitry determines that the magnetic marker has been detected by the magnetic sensor, and
the vehicle-mounted circuitry is configured not to supply the operating power to the radio tag when the vehicle-mounted circa circuitry determines that the magnetic marker has not been detected by the magnetic sensor.

* * * * *